US012750109B2

(12) United States Patent
Sangdeh et al.

(10) Patent No.: US 12,750,109 B2
(45) Date of Patent: Sep. 29, 2026

(54) METADATA GENERATION FOR ARTIFICIAL INTELLIGENCE (AI) / MACHINE LEARNING (ML) MODELS

(71) Applicant: MEDIATEK INC., Hsinchu (TW)

(72) Inventors: Pedram Kheirkhah Sangdeh, San Jose, CA (US); Gyu Bum Kyung, San Jose, CA (US)

(73) Assignee: MEDIATEK INC., Hsinchu (TW)

( * ) Notice: Subject to any disclaimer, the term of this patent is extended or adjusted under 35 U.S.C. 154(b) by 323 days.

(21) Appl. No.: 18/517,195

(22) Filed: Nov. 22, 2023

(65) Prior Publication Data

US 2024/0178897 A1 May 30, 2024

Related U.S. Application Data

(60) Provisional application No. 63/384,959, filed on Nov. 24, 2022.

(51) Int. Cl.

*H04B 17/26* (2015.01)
*H04B 7/06* (2006.01)
*H04B 17/391* (2015.01)

(52) U.S. Cl.

CPC ........... *H04B 7/0626* (2013.01); *H04B 17/26* (2015.01); *H04B 17/3913* (2015.01)

(58) Field of Classification Search

CPC ... H04B 7/0626; H04B 17/26; H04B 17/3913
See application file for complete search history.

(56) References Cited

U.S. PATENT DOCUMENTS

2025/0184088 A1* 6/2025 Hao ...................... H04L 5/0053
2025/0260628 A1* 8/2025 Tian ........................ H04L 41/16

OTHER PUBLICATIONS

Han Li, "A Novel Blind Signal Detector Based on the Entropy of the Power Spectrum Subband Energy Ratio", Mar. 1, 2021, Entropy, vol. 23, p. 3-10.*

* cited by examiner

*Primary Examiner* — Jay P Patel
*Assistant Examiner* — Shehab A Alawdi
(74) *Attorney, Agent, or Firm* — Troutman Pepper Locke LLP; Tim Tingkang Xia, Esq.

(57) ABSTRACT

In an aspect of the disclosure, a method, a computer-readable medium, and an apparatus are provided. The apparatus may be a user equipment (UE). The UE generates metadata for channel state information (CSI) samples. The UE uses the generated metadata to categorize the CSI samples into one or more subsets. The UE uses each subset of the one or more subsets to train a machine learning model or a part of a machine learning model.

16 Claims, 13 Drawing Sheets

1100

METADATA GENERATION FOR ARTIFICIAL INTELLIGENCE (AI) / MACHINE LEARNING (ML) MODELS

CROSS-REFERENCE TO RELATED APPLICATION(S)

This application claims the benefits of U.S. Provisional Application Ser. No. 63/384,959, entitled "METHOD AND APPARATUS OF GENERATING METADATA FOR ARTIFICIAL INTELLIGENCE (AL)/MACHINE LEARNING (ML) MODELS" and filed on Nov. 24, 2022, which is expressly incorporated by reference herein in its entirety.

BACKGROUND

Field

The present disclosure relates generally to communication systems, and more particularly, to techniques of utilizing metadata in artificial intelligence (AI)/machine learning (ML) models.

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The UE generates metadata for channel state information (CSI) samples. The UE uses the generated metadata to categorize the CSI samples into one or more subsets. The UE uses each subset of the one or more subsets to train a machine learning model or a part of a machine learning model.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
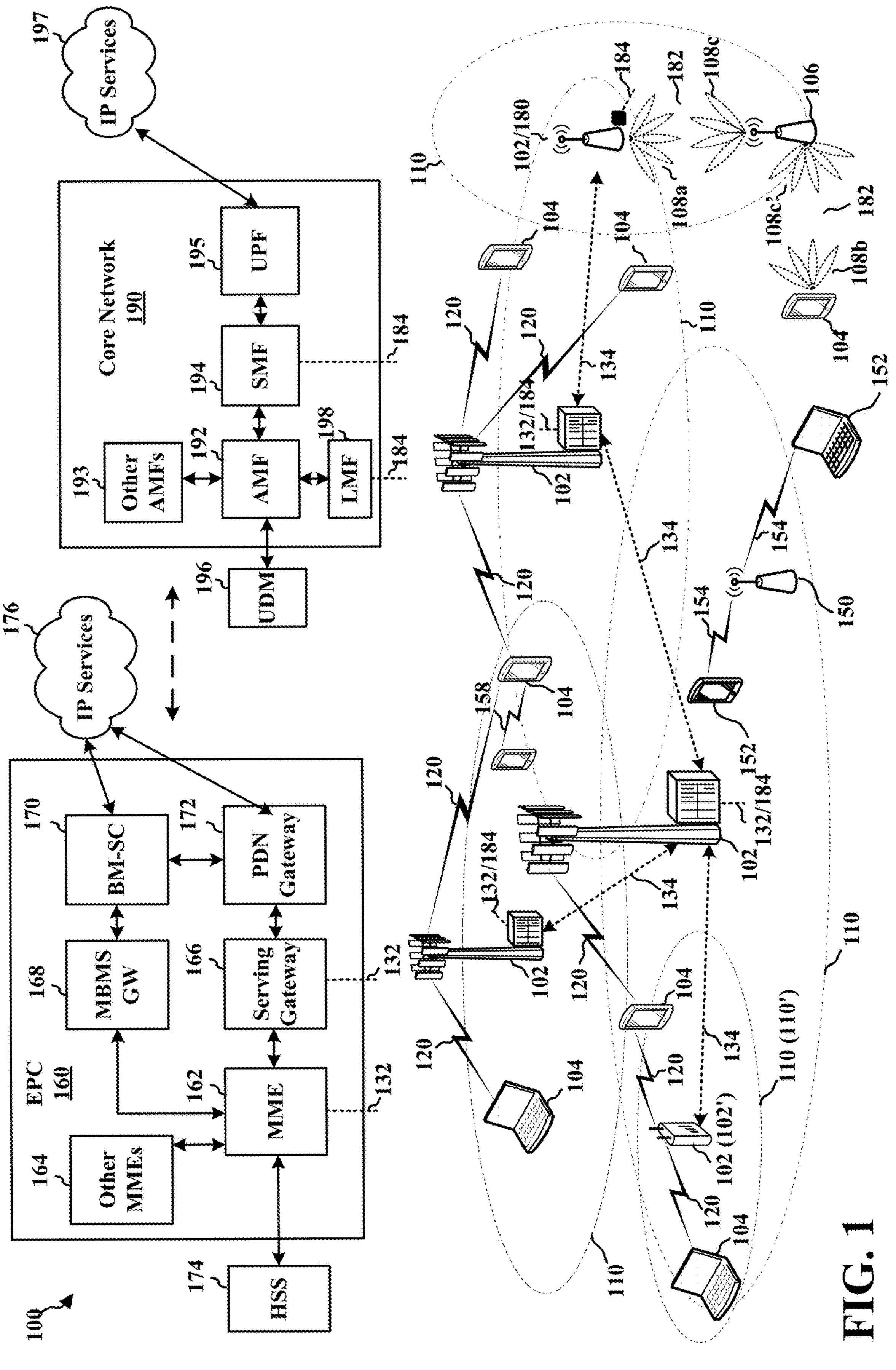
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., SI interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to X MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102" may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 108*a*. The UE 104 may receive the beamformed signal from the base station 180 in one or more receive directions 108*b*. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a location management function (LMF) 198, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 194 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-Advanced (LTE-A), Code Division Multiple Access (CDMA), Global System for Mobile communications (GSM), or other wireless/radio access technologies.

Figure 2:
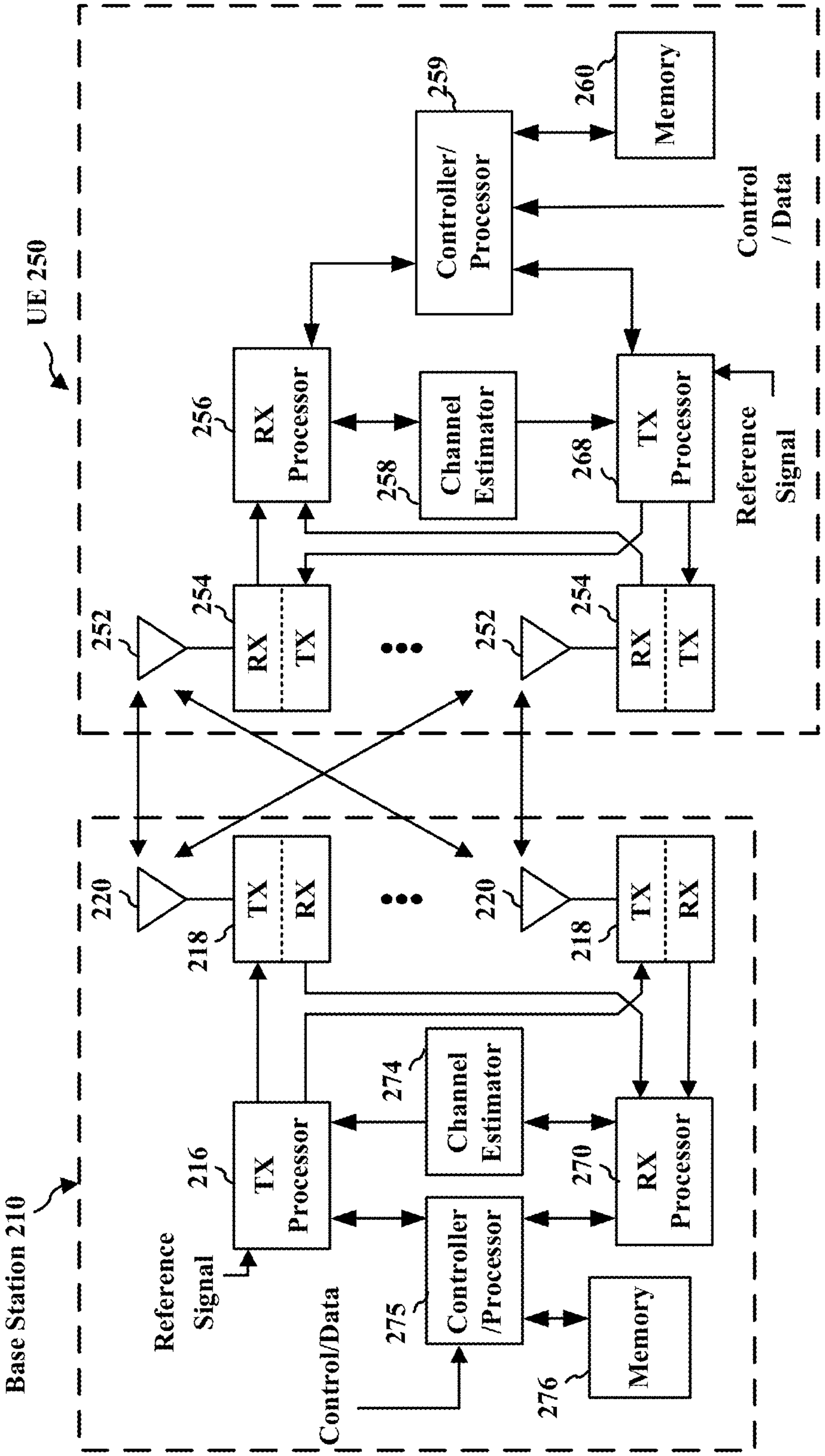
FIG. 2 is a diagram illustrating a base station in communication with a UE in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHz may be supported. In one example, NR resource blocks (RBs) may span 12 sub-carriers for each RB with a subcarrier spacing (SCS) of 60 kHz over a 0.25 ms duration or a SCS of 30 kHz over a 0.5 ms duration (similarly, 15 kHz SCS over a 1 ms duration). Each radio frame may consist of 10 subframes (10, 20, 40 or 80 NR slots) with a length of 10 ms. Each slot may indicate a link direction (i.e., DL or UL) for data transmission and the link direction for each slot may be dynamically switched. Each slot may include DL/UL data as well as DL/UL control data. UL and DL slots for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
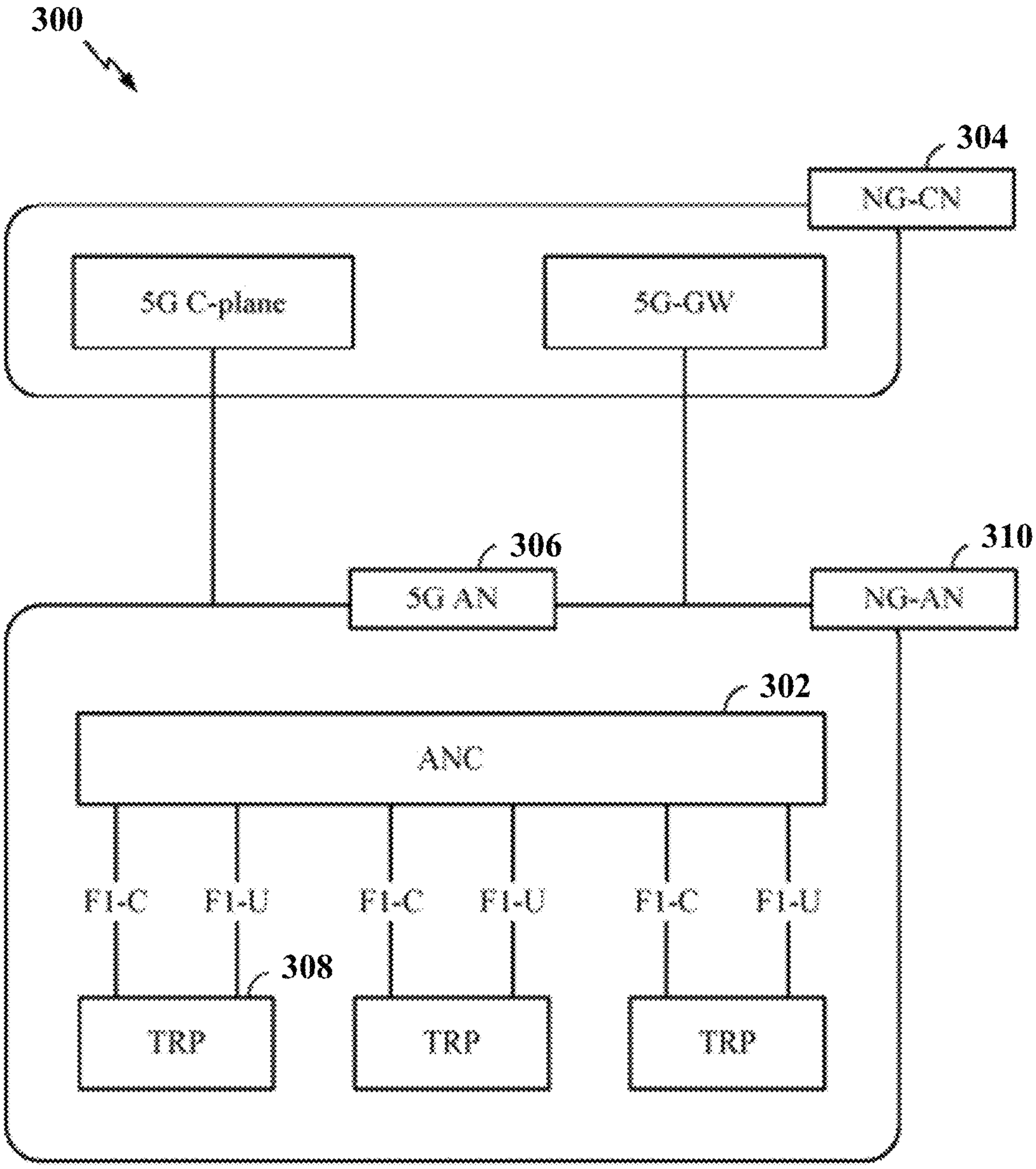
FIG. 3 illustrates an example logical architecture of a distributed access network.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN. The backhaul interface to the next generation core network (NG-CN) 304 may terminate at the ANC. The backhaul interface to neighboring next generation access nodes (NG-ANs) 310 may terminate at the ANC. The ANC may include one or more TRPs 308 (which may also be referred to as BSs, NR BSs, Node Bs, 5G NBs, APs, or some other term). As described above, a TRP may be used interchangeably with “cell.”

The TRPs 308 may be a distributed unit (DU). The TRPs may be connected to one ANC (ANC 302) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
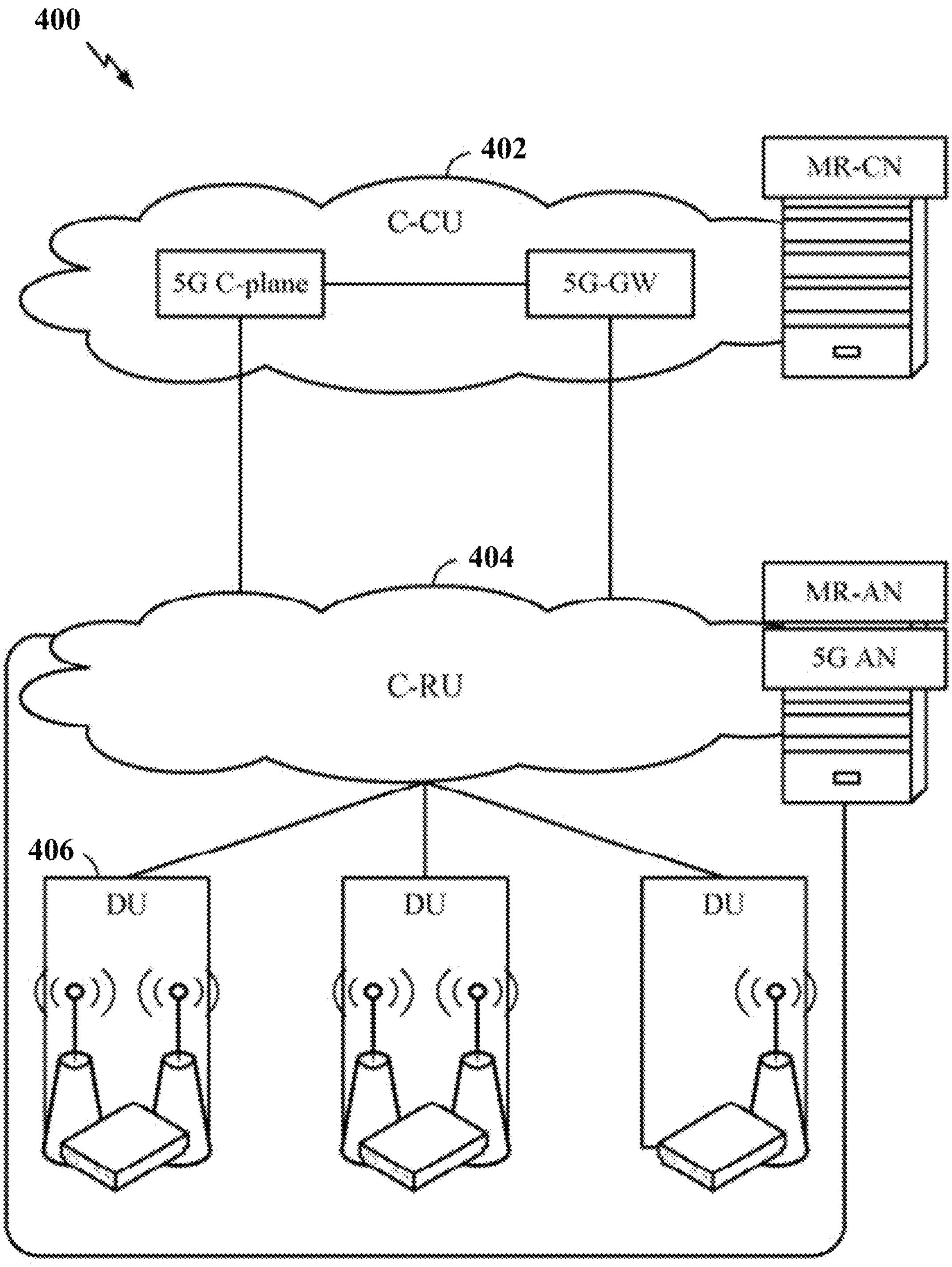
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
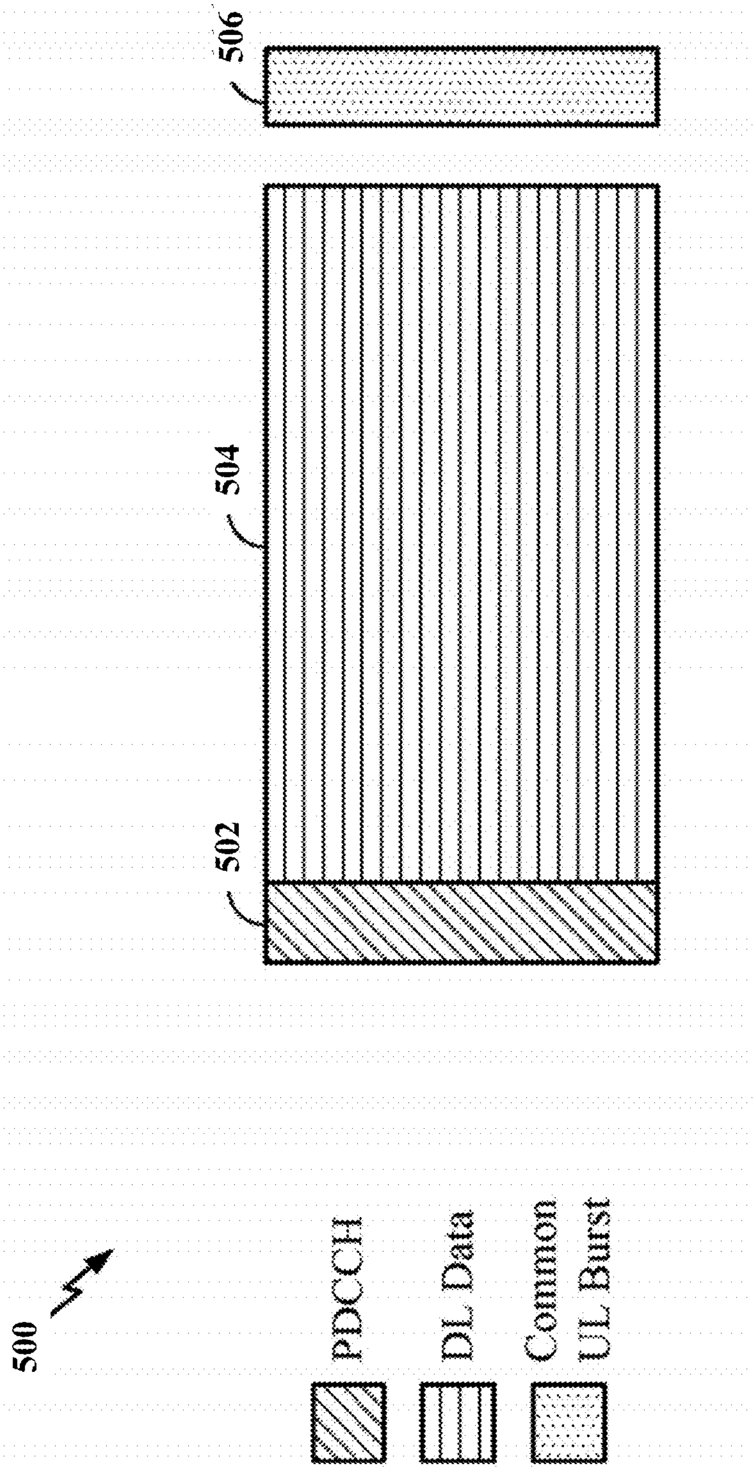
FIG. 5 is a diagram showing an example of a DL-centric slot.

FIG. 5 is a diagram 500 showing an example of a DL-centric slot. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include a common UL portion 506. The common UL portion 506 may sometimes be referred to as an UL burst, a common UL burst, and/or various other suitable terms. The common UL portion 506 may include feedback information corresponding to various other portions of the DL-centric slot. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric slot and alternative structures having similar features may exist without necessarily deviating from the aspects described herein.

Figure 6:
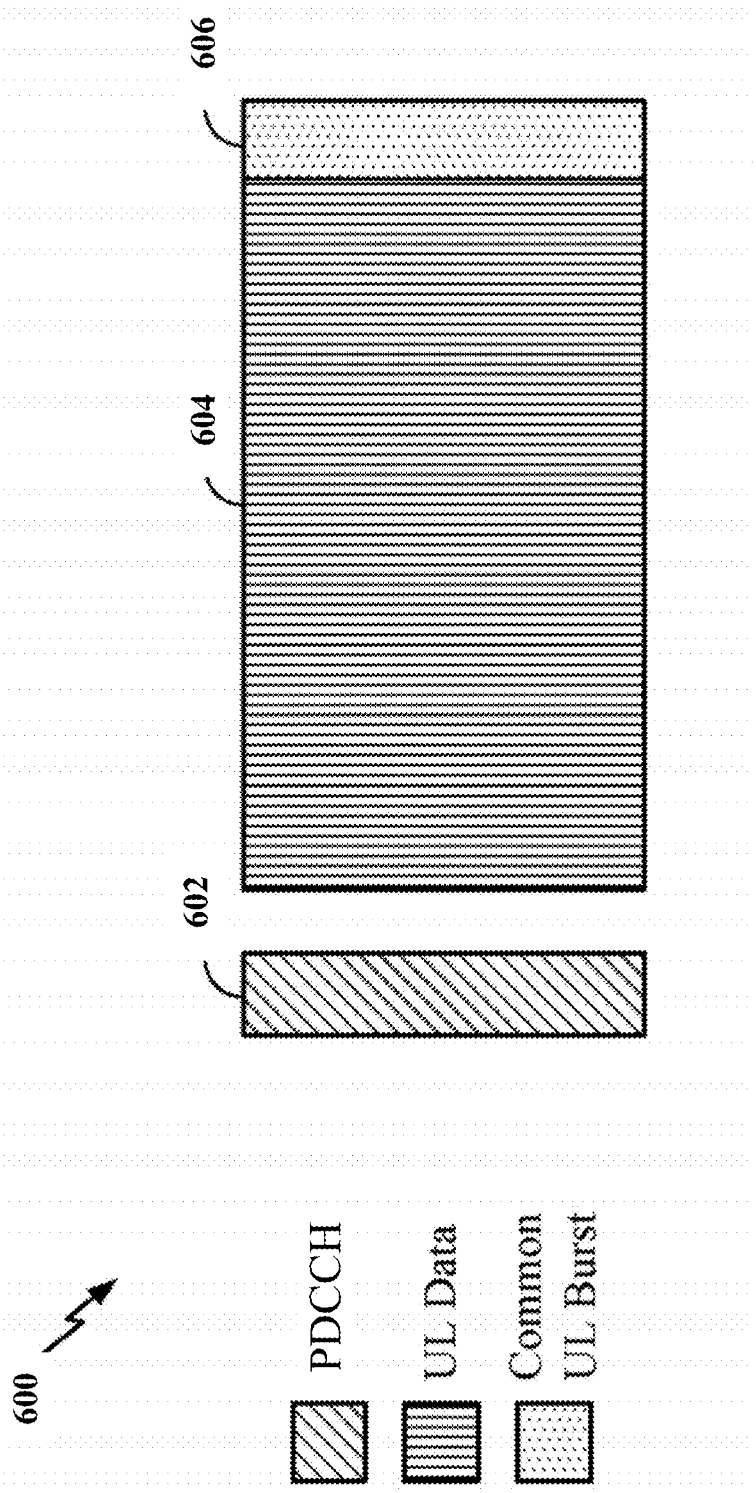
FIG. 6 is a diagram showing an example of an UL-centric slot.

FIG. 6 is a diagram 600 showing an example of an UL-centric slot. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL data portion 604. The UL data portion 604 may sometimes be referred to as the pay load of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric slot may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric slot and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 7:
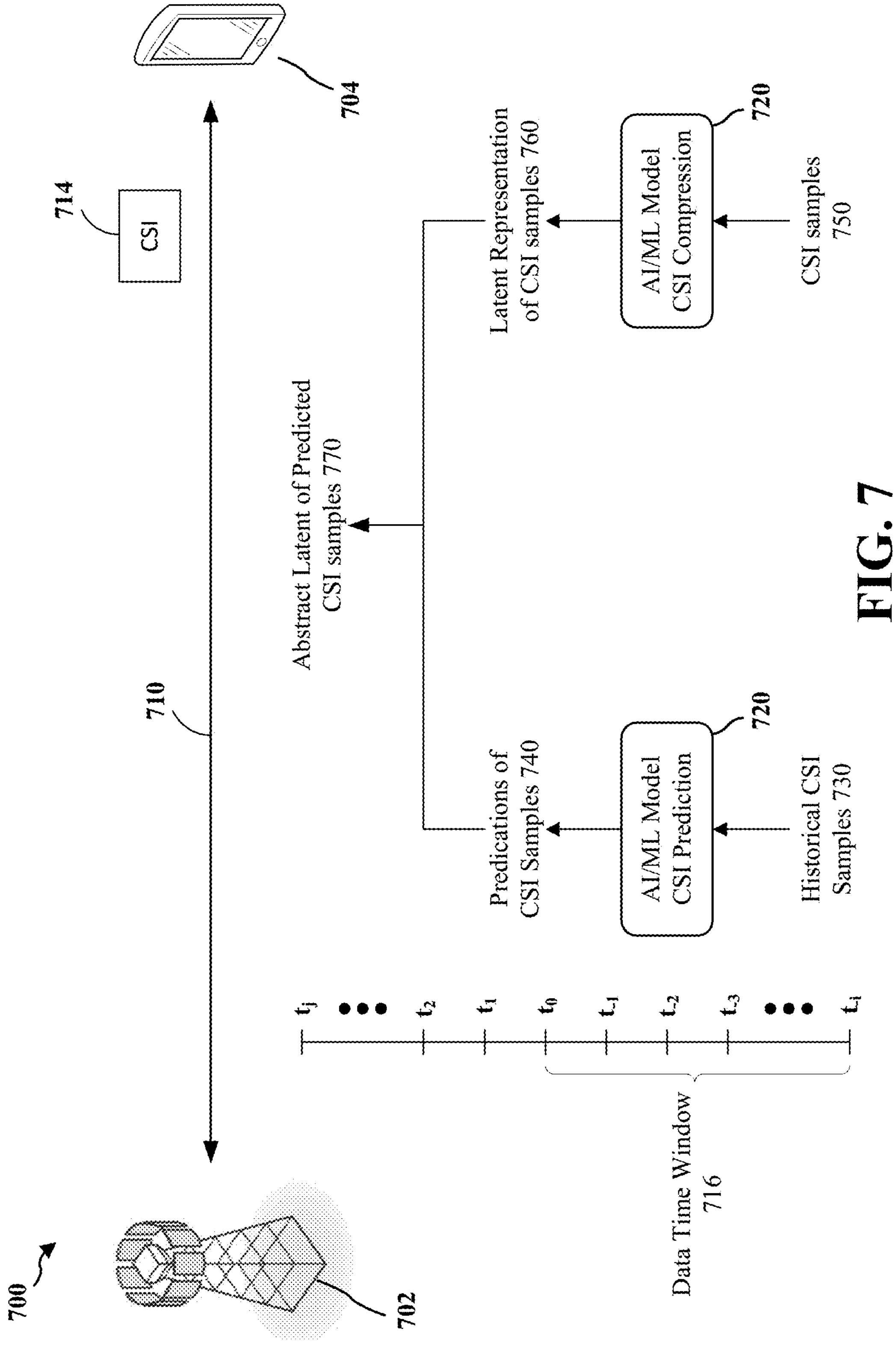
FIG. 7 is a diagram illustrating AI/ML model for CSI feedback enhancement at UE side.

FIG. 7 is a diagram 700 illustrating AI/ML model for CSI feedback enhancement at UE side. In this example, a base station 702 communicates with a UE 704 through a channel 710. Channel properties of the channel 710 (i.e., a wireless communication link) is referred to as channel state information (CSI) 714. This information describes how a signal propagates from the transmitter at the base station 702 to the receiver at the UE 704 and represents the combined effect of scattering, multipath fading, signal power attenuation with distance, etc. The knowledge of the CSI 714 at the transmitter and/or the receiver makes it possible to adapt data transmission to current channel conditions, which is beneficial for achieving reliable and robust communication with high data rates in multi-antenna systems. The CSI 714 is often required to be estimated at the receiver, and usually quantized and fed back to the transmitter. The CSI 714 may include CQI, PMI, CSI-RS resource indicator (CRI), SS block resource indicator, layer indication (LI), rank indicator (RI), and/or and L1-RSRP measurements. The UE 704 measures the spatial channel 710 between itself and the base station 702 using the CSI-RS transmitted from the base station 702 in order to generate the CSI report 714. The UE 704 then calculates the CSI-related metrics and reports the CSI 714 to the base station 702.

The UE 704 is equipped with an AI/ML model 720. In certain configurations, the AI/ML model 720 may perform CSI prediction. More specifically, the AI/ML model 720 analyzes a historical sequence of CSI samples 730 to discover patterns or trajectories within the data. Recognizing these trends allows the AI/ML model 720 to predict future CSI Samples 740 of the communication channel.

For instance, at the current moment to, the UE 704, which periodically measures channel attributes such as Reference Signal Received Power (RSRP), has accumulated a window of historical data extending back to time $t_{-i}$. This collection forms a dynamic representation of the channel's time-variant characteristics. The historical data within this window, referred to as $[t_{-i}, t_0]$, serves as the input for the AI/ML model 720 to anticipate the channel state at future time instances $t_1, t_2, \ldots, t_j$.

In certain configurations, the AI/ML model 720 may perform CSI Compression. Initially, the AI/ML model 720 receives CSI sample 750. This raw CSI sample typically has high dimensionality and redundancy. The AI/ML model 720 is designed to extract the most salient features and patterns from the high-dimensional CSI input and map it to a much lower dimensional latent space representation. To reduce the overhead of transmitting extensive CSI feedback, the AI/ML model 720 compresses the CSI sample 750 into an abstract latent representation 760. This condensed format of CSI enables more efficient transmission due to its smaller size, leading to lower feedback overhead. A corresponding AI/ML model at the base station 702 is then responsible for decompressing this latent data to approximate the original CSI.

In certain configurations, the AI/ML model 720 performs prediction and compression jointly. The predicted CSI samples are compressed prior to being sent. An abstract latent representation 770 then contains the essence of the forecasted CSI.

Figure 8:
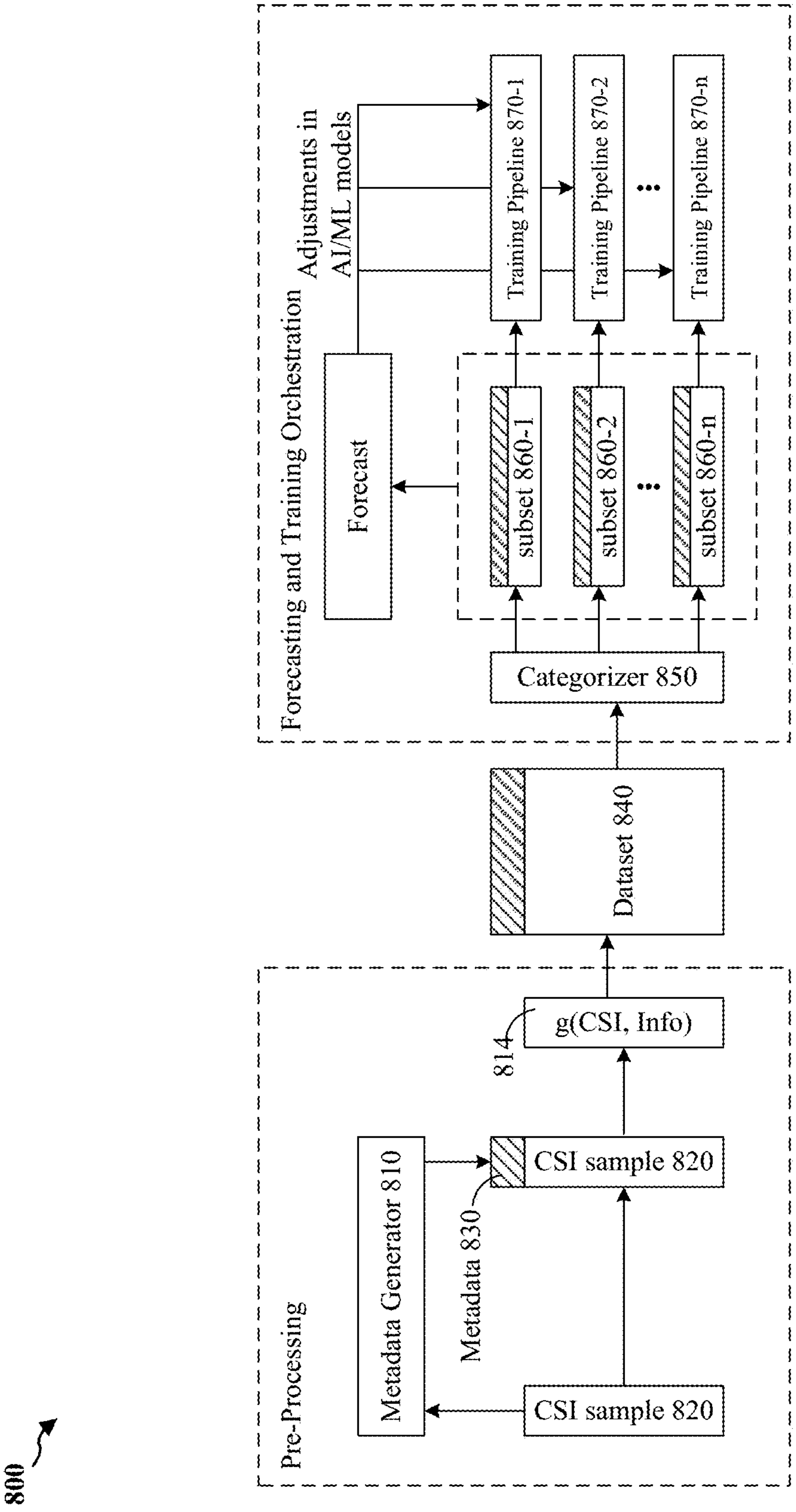
FIG. 8 is a diagram illustrating metadata-based data preparation and training for AI/ML models.

FIG. 8 is a diagram 800 illustrating metadata-based data preparation and training for AI/ML models. A metadata generator 810 generates a set of metadata 830 derived from received CSI sample 820. This metadata 830 describe properties and characteristics of the CSI sample 820. The metadata 830 captures relevant properties like sparsity, smoothness, predictability, compressibility etc. that impact processing by the AI/ML model 720. The metadata 830 can be statistical aggregates like mean, variance, entropy, correlation computed over the data. It can also be data-specific measures like Power Spectral Entropy described infra. The generated metadata 830 is then concatenated with the original CSI sample 820. As such, the UE 704 may measure multiple CSI samples and use the metadata generator 810 to generate the corresponding multiple sets of metadata.

The UE 704 inputs multiple CSI samples and corresponding sets of metadata to a dataset generator 814, which generate a dataset 840 that includes both the raw CSI data and their descriptive metadata.

A categorizer 850 processes the dataset 840 to organize the CSI samples based on their respective metadata, leading to structured subsets 860-1, 860-2, . . . , **860-*n*. These categorized subsets 860-1, 860-2, . . . , 860-*n* are then distributed to multiple dedicated training pipelines 870-1, 870-2, . . . , 870-*n***. Each pipeline may pertain to training individual AI/ML models or a part of a model or pertain to applying a subset of ML techniques tailored to the categorized data. Within these pipelines, dedicated machine learning models are trained, or specialized subsets of machine learning techniques are applied, to address the nuances and challenges presented by their unique metadata. The utilization of metadata in this context serves to orchestrate the training procedures, ensuring that models are developed in a manner that is responsive to the underlying data features.

Further, the metadata associated with each data subset can also be used to forecast the final result of the training of a pipeline. Before committing to the long and resource-intensive process of training through a pipeline, the metadata can be analyzed to predict how difficult the training will be. For example, certain patterns in the metadata might indicate that the training task will be complex, and the model will need to be more sophisticated (larger, with more layers or different structures, for instance). Conversely, if the training task is expected to be simpler, a less complex model might suffice. As such, based on the forecast, decisions can be made regarding the complexity and configuration of the AI/ML model for each pipeline.

Figure 9:
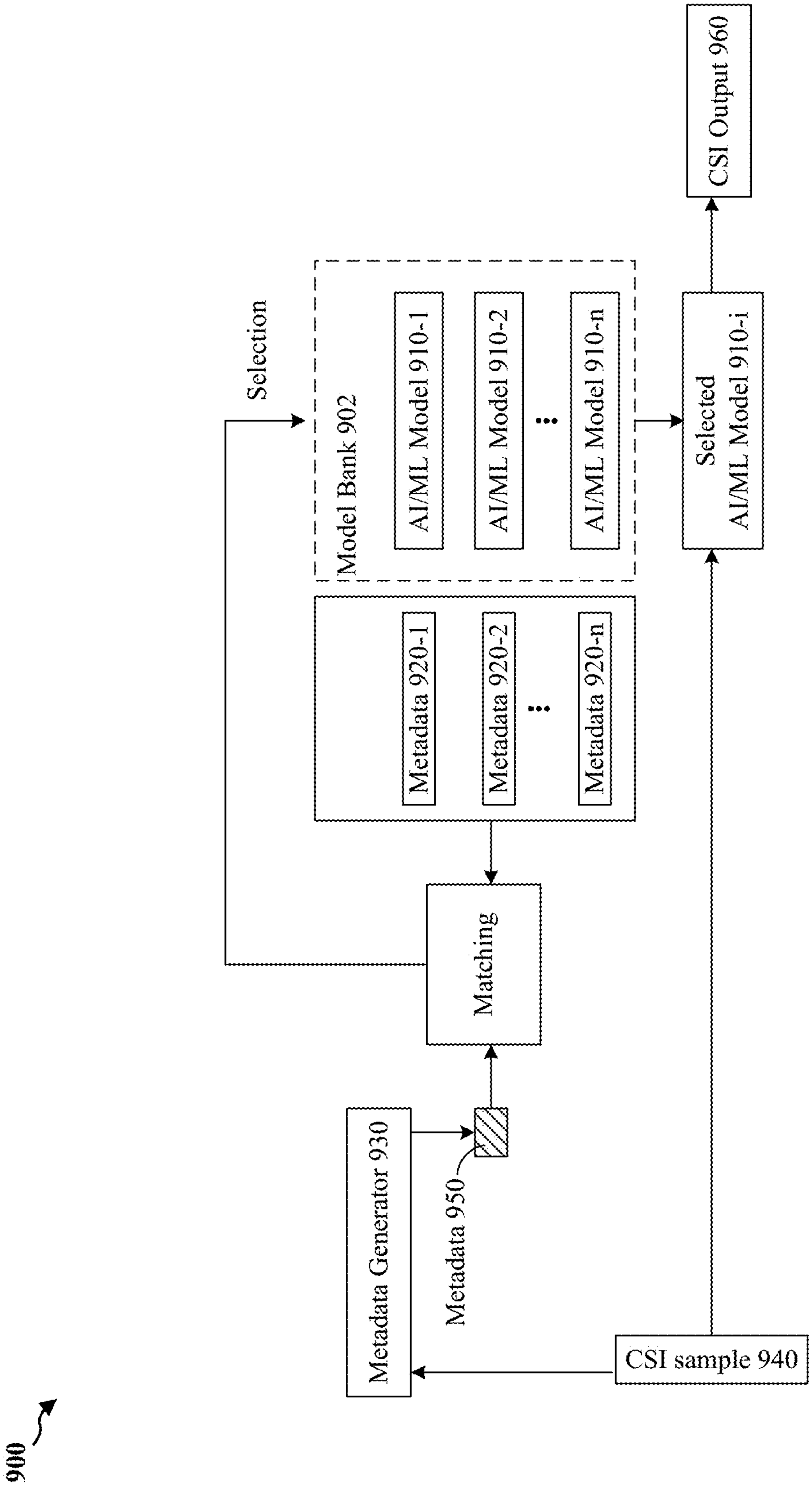
FIG. 9 is a diagram illustration metadata-based inference.

FIG. 9 is a diagram 900 illustration metadata-based inference. An inference stage is at after the AI/ML models have already been trained. In the inference stage, the trained models are deployed and used to make predictions/inferences on new, unseen data. The goal in this stage is to monitor the performance of the models and ensure they are working well on the real-world data they are inferencing on. If a model is not performing well, based on the metadata of the new data, a different pre-trained model can be selected that is a better match for that data. The metadata of the new data is compared against metadata of the training data for each model. If a match is found, that model is selected. If no match is found, the model with the closest/most similar training data metadata can be reused or a non-ML model can be fallen back to.

In this example, a model bank 902 includes AI/ML models 910-1, 910-2, . . . , 910-*n* that have been trained. Metadata 920-1, 920-2, . . . , 920-*n* are metadata of the training datasets corresponding to the AI/ML models 910-1, 910-2, . . . , 910-*n* respectively. In the inference stage, the goal is to monitor the performance of the trained AI/ML model. The model's performance is continually assessed to determine if it is functioning well. If not, there is a need to switch to another trained AI/ML model from the model bank 902.

A metadata generator 930 generates metadata 950 based on a received new CSI sample 940. This metadata 950 provides statistics about the CSI sample 940, such as averages or other characteristics. The statistics of the metadata 950 from the current CSI sample 940 are matched with the metadata 920-1, 920-2, . . . , 920-*n* corresponding to the AI/ML models 910-1, 910-2, . . . , 910-*n* in the model bank 902.

If a match is found between the metadata 950 from the current CSI sample 940 and the metadata 920-1, 920-2, . . . , 920-*n* corresponding to the AI/ML models 910-1, 910-2, . . . , 910-*n* in the model bank 902, it implies that the model with the matched metadata was trained for a similar scenario or configuration and it is suitable for the current situation. This model, e.g., the AI/ML model 910-*i*, is selected for inference.

If no match is found, it indicates occurrence of unseen scenario/configuration. In this situation, an AI/ML model in the model bank 902 with the closest metadata is re-used.

Therefore, the selected AI/ML model with the matched metadata or the re-used AI/ML model with the closest metadata is loaded. In this example, the AI/ML model 910-*i* is loaded.

Subsequently, the CSI sample 940 and other CSI samples are input into the AI/ML model 910-*i*. AI/ML model 910-*i* accordingly perform prediction and/or compression as described supra to generate a CSI output 960.

Figure 10:
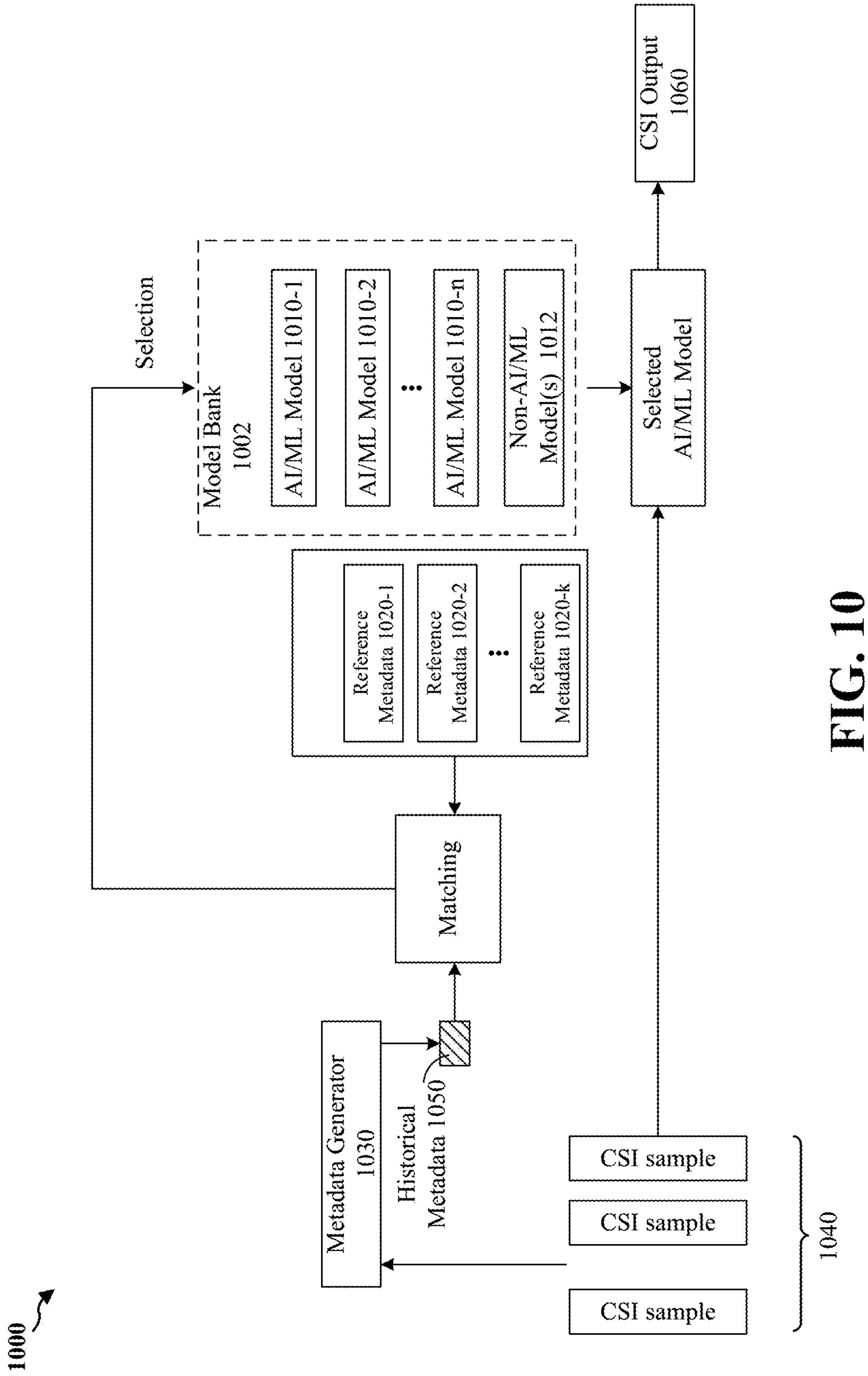
FIG. 10 illustrates metadata-based AI/ML model monitoring.

FIG. 10 illustrates metadata-based AI/ML model monitoring. In this scenario, a model bank 1002 includes AI/ML models 1010-1, 1010-2, . . . , 1010-*n* that have been trained previously as well as one or more non-AI/ML models 1012.

A metadata generator 1030 generates historical metadata 1050 based on collected historical CSI samples 1040 from the current environment. This historical metadata 1050 is then matched with pre-defined reference metadata 1020-1, 1020-2, . . . , 1020-*k* in form of specific values, distributions, or statistics.

If the historical metadata 1050 matches with one of the reference metadata 1020-1, 1020-2, . . . , 1020-*k*, this implies no significant change in the environment. In this case, the currently activated AI/ML model is maintained. However, if the historical metadata 1050 does not match with any of the reference metadata 1020-1, 1020-2, . . . , 1020-*k*, it signifies a deviation from normal conditions, triggering a monitoring event.

A monitoring system of the UE 704 evaluates how similar the historical metadata is to the reference metadata of each AI/ML model. The historical metadata represents the current or recent states of the communication channel.

If the system detects that the current model's performance is no longer optimal due to a significant mismatch (i.e., the reference metadata of the active model is no longer similar to the historical metadata), it triggers a deactivation of the current model.

After deactivation, the system looks for another AI/ML model within the model bank that has reference metadata more similar to the current historical metadata. This process may involve selecting the most suitable model for the current conditions. Once a suitable model is found, the system triggers activation where the newly selected model is put into service and begins making predictions or compressing CSI data.

If no match is found among the existing AI/ML models 1010-1, 1010-2, . . . , 1010-*n*, it indicates the occurrence of an unseen scenario/configuration. In this case, the system falls back to a non-AI/ML model 1012.

Alternatively, if the system finds that the active AI/ML model's reference metadata is still sufficiently similar to the historical metadata, the system may decide to maintain the current model without any changes. In other words, the model remains active because it is still considered appropriate for current channel conditions.

Therefore, this metadata-based monitoring approach enables AI/ML model activation/deactivation in a one-sided manner at the UE without needing to transfer actual CSI samples or models. The UE can independently monitor performance and determine if model switching is needed by only using locally generated metadata, without needing to share samples or models across the air interface. This approach can serve as a trigger for more precise two-sided monitoring methods involving sample/model transfer when required.

Upon determining the most applicable AI/ML model, or opting to revert to a legacy model, the system proceeds with processing the CSI samples. The selected AI/ML model (or the fallback non-AI/ML model) leverages the incoming CSI data to produce a CSI output 1060, which could include predictions about future channel states or compressed versions of the CSI for feedback enhancement purposes.

A successful metadata generation method for CSI feedback enhancement should indeed meet various criteria to be effective and practical. The metadata generation method should be capable of capturing the effects of the environment, including geometric factors and characteristics of the communication medium, on CSI samples. To be practical, the method should not impose a heavy computational burden on the UE. It should be efficient and suitable for real-time or near-real-time operation. The generated metadata should have an intuitive meaning or interpretable relationship with the final objectives of AI/ML models. This makes it easier to understand and use the metadata for decision-making. Metadata should be derivable on a per CSI sample basis, enabling fine-grained analysis and adaptability for each data point without needing to accumulate multiple samples. The method should not rely on accumulating a large number of CSI samples over time. It should be able to provide meaningful metadata for a single CSI sample, if needed. The metadata generation process should be generalizable to different scenarios and configurations without requiring significant effort or modification. It should adapt to a wide range of conditions.

Figure 11:
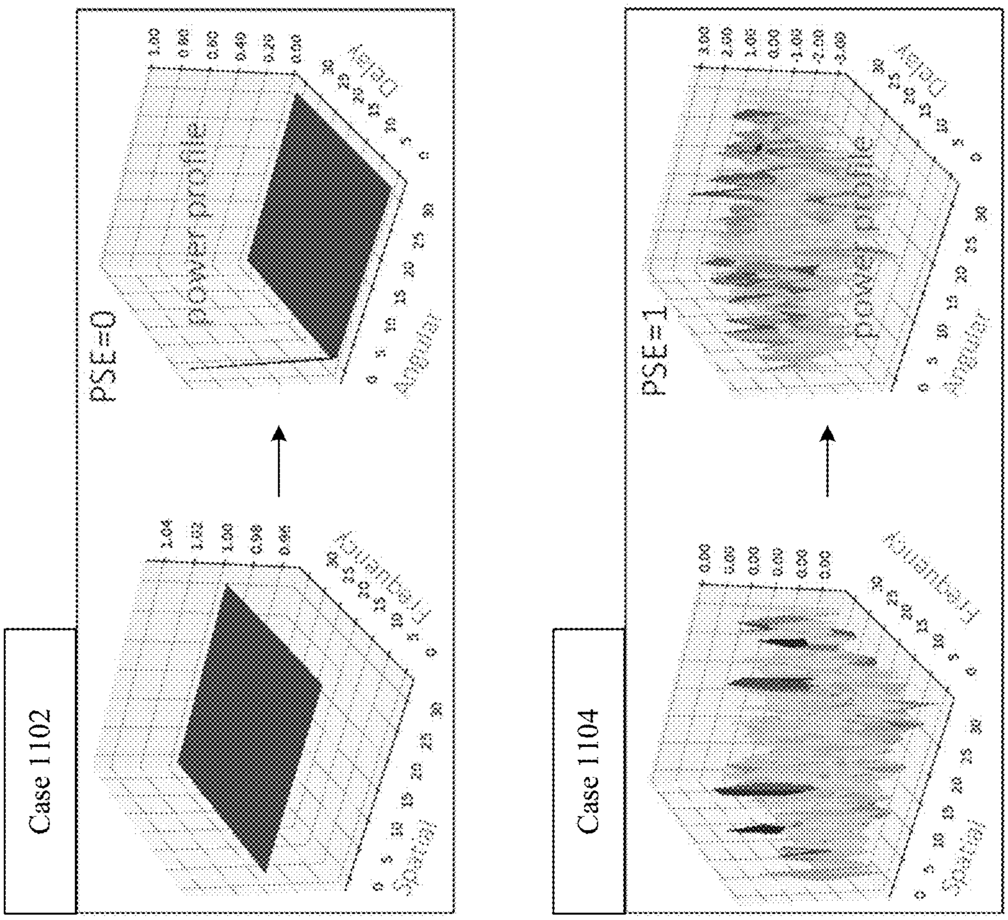
FIG. 11 is a diagram illustrating power spectral entropy (PSE) as an example of metadata.

FIG. 11 is a diagram 1100 illustrating power spectral entropy (PSE) as an example of metadata. Power Spectral Entropy (PSE) is an exemplary form of metadata that aids in the pre-processing, training, and monitoring of AI/ML models in the context of CSI feedback.

PSE can be used as metadata that quantifies the spectral dispersion of CSI samples and is instrumental in determining their compressibility and predictability.

The UE 704 measures a CSI sample in time-spatial-frequency domain x[m, n, w] with dimensions M×N×W. The UE 704 calculates the 3D DFT as:

$$X[l, i, j] = \frac{1}{MNW}\sum_{m=0}^{M-1}\sum_{n=0}^{N-1}\sum_{w=0}^{W-1} x[m, n, w]e^{-j2\pi\left(\frac{l}{M}m+\frac{i}{N}n+\frac{j}{W}w\right)}$$

The UE 704 computes the power profile P[l, i, j] in the spectral domain by normalizing the magnitude squared of X[l, i, j] as follows:

$$P[l, i, j] = \frac{|X[l, i, j]|^2}{\sum_l \sum_i \sum_j |X[l, i, j]|^2}$$

The UE 704 then determine the PSE by computing entropy across the power profile:

$$PSE(x) = \frac{-1}{\log_2(MNW)}\sum_l\sum_i\sum_j P[l, i, j]\cdot\log_2 P[l, i, j]$$

PSE can be generalized to any sub-domain (e.g., spatial-frequency, frequency, etc.) using 2D or 1D FFT along with necessary normalization and entropy calculations.

PSE quantifies the dispersion of a CSI sample in the spectral domain. PSE provides a numerical value that represents the spread or distribution of power across the frequency spectrum of the CSI sample. A signal with power concentrated in a narrow frequency band will have low spectral dispersion, while a signal with power spread out over many frequencies will have high spectral dispersion.

PSE indicates how much a CSI sample is easy to compress and handle by an AI/ML model. The PSE value serves as an indicator of compressibility of a CSI sample. Compressibility relates to the ability to represent a signal with fewer bits without significant loss of information. A low PSE value, indicating less dispersion in the spectral domain, suggests that the signal is more redundant or has a simpler structure, making it easier to compress. Conversely, a high PSE value implies more complexity and less redundancy, meaning that the signal is harder to compress efficiently.

In case 1102: A DC signal has no dispersion in spectral domain and can be abstracted to one element, resulting in a PSE of zero. The spectral representation of a DC signal will have a single peak or impulse at one frequency bin, and all other bins are zero. This reflects the fact that a constant DC waveform contains only a single frequency—zero frequency or 0 Hz.

Since the energy is entirely concentrated into one frequency bin, a DC signal has no dispersion in the spectral domain. Dispersion refers to how spread out or distributed a signal's energy is across the frequency spectrum. For a DC signal, there is zero dispersion as all power is in a single bin.

This property makes a DC signal highly compressible. Its entire structure and information content can be encapsulated by a single value corresponding to that one non-zero spectral component. In other words, it can be abstracted and reduced down to one element—the amplitude of the DC component. The extreme simplicity and compressibility of a DC signal can be visualized by its PSE.

In case 1104: White noise have all spectral components with equal power, and it is fully dispersed in spectral domain. White noise cannot be abstracted, and its PSE quals to 1. White noise refers to a signal with a flat power spectral density, meaning it contains equal power across all frequencies within a band. When white noise passes through a Fourier transform into the spectral domain, the power is spread uniformly across all frequency bins.

This full dispersion means white noise has maximum entropy and complexity. There is no detectable pattern or redundancy that could be leveraged for compression. The signal is completely random without any structure that could be abstracted or simplified.

Therefore, white noise is minimally compressible—no abstraction or reduction of the signal is possible without losing information. As PSE measures dispersion in the spectral domain, a fully dispersed white noise signal will have the maximum PSE value of 1. This indicates that no compression is feasible by an AI/ML model without loss of fidelity.

The PSE metric serves as a valuable form of metadata that provides insights into channel state information (CSI) to assist AI/ML models for wireless communications applications. When computed on CSI samples, PSE has a number of key advantages that make it well-suited as a metadata.

Firstly, PSE quantifies the inherent compressibility of both individual CSI samples and full datasets by measuring the spectral dispersion or spread of energy distributions. Signals with lower PSE values have higher compressibility, as more energy is concentrated into fewer dominant spectral components. This enables estimating the performance of compression tasks on given CSI data.

Secondly, PSE provides a quantitative metric that can compare the effectiveness of different candidate preprocessing techniques applied to CSI data. More effective techniques reduce redundancy in the CSI samples leading to lower PSE values and ultimately improved compressibility after subsequent AI/ML-based compression. Therefore, PSE helps identify optimal preprocessing.

Furthermore, PSE can be incorporated within CSI preprocessing pipelines as an intermediate step. Optimizing the preprocessing methods to minimize PSE leads to enhanced compressibility once the preprocessed CSI data is fed to the AI/ML compression models.

Additionally, since PSE reflects inherent properties of the wireless propagation environment, detecting changes in PSE distributions can reveal significant environmental changes like transitions from indoor to outdoor settings. This makes PSE valuable input for AI/ML model monitoring and adaptation mechanisms in dynamic conditions.

Moreover, PSE can be calculated in a self-contained manner on individual CSI samples at the UE side without needing external data. This localized per-sample metadata provides fine-grained environmental insights.

Also, the PSE computation procedure is agnostic to wireless communication parameters like the number of antennas. It can be easily scaled up without modification across many configurations and scenarios.

Finally, calculating PSE does not add substantial computational overhead to UEs as it relies on basic signal processing operations like FFTs. It is lightweight enough to enable real-time embedded use even on resource-constrained devices.

Figure 12:
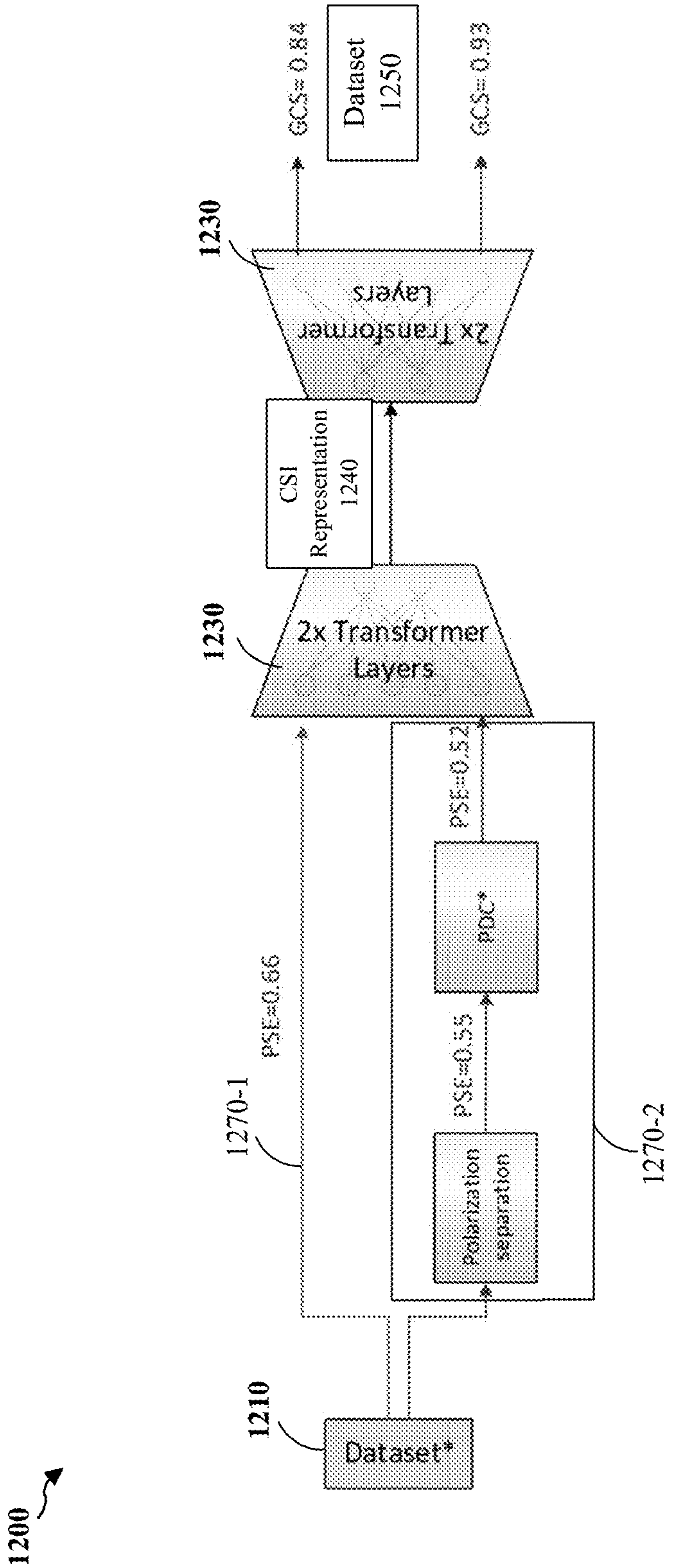
FIG. 12 is a diagram illustrating PSE-based compressibility indication.

FIG. 12 is a diagram 1200 illustrating PSE-based compressibility indication. The UE 704 obtains a CSI dataset 1210. In a first path 1270-1, the dataset 1210 is not further processed and is input into an AI/ML models 1230, which has two transformer layers in this example. In this example, the dataset 1210 may have a PSE of 0.66. The AI/ML models 1230 process the CSI dataset 1210 to generate a CSI representation 1240. The UE 704 transmits the CSI representation 1240 to the base station 702. The base station 702 may be equipped with the same AI/ML models 1230, which processes the CSI representation 1240 to generate a recovered CSI dataset 1250. In this example, a Generalized Cosine Similarity (GCS) of 0.84 is achieved between the original and recovered dataset.

Alternatively, in a second path 1270-2, the CSI dataset 1210 undergoes preprocessing, including polarization separation and phase discontinuity compensation (PDC), to reduce redundancy in the CSI samples. After the polarization separation, the PSE of the CSI dataset 1210 is lowered to 0.55. After PDC, the PSE of the CSI dataset 1210 is lowered to 0.52. Similarly, the AI/ML models 1230 process the CSI dataset 1210 to generate the CSI representation 1240. The UE 704 then transmits the CSI representation 1240 to the base station 702. The base station 702 uses the same AI/ML models 1230 to process the CSI representation 1240 to generate the recovered CSI dataset 1250. In this path, a GCS of 0.93 is achieved between the original and recovered dataset.

This example demonstrates that reducing the PSE of a dataset through preprocessing techniques enhances its compressibility. The lower PSE indicates less spectral dispersion, more concentration of energy, and higher redundancy that can be exploited by compression algorithms.

PSE measures two key characteristics of CSI samples—their smoothness across the antenna-frequency domain and their sparsity/dispersion when represented in the spectral domain. The smoothness in the antenna-frequency domain refers to the level of redundancy and predictability in CSI values across different antennas and subcarrier frequencies. A CSI signal that exhibits less variability and is smoother or more predictable across antennas and frequencies can be compressed more effectively.

Additionally, PSE measures the sparsity/dispersion of a CSI sample when transformed into the spectral domain via a Fourier transform. Higher dispersion implies the CSI signal energies are more spread out in the frequency spectrum, leading to less sparsity. Lower sparsity makes the CSI signal more complex and difficult to compress.

Therefore, a lower PSE value indicates higher smoothness and predictability in the antenna-frequency domain as well as less dispersion and higher sparsity in the spectral domain. This combination of higher smoothness and sparsity makes the CSI signal more redundant and structurally simpler. More redundancy and simpler structure lead to higher compressibility; the signal can be compressed to a smaller size without losing much information content.

The PSE metric not only predicts the final compression performance, but also evaluates the effectiveness of preprocessing methods applied to CSI data.

Lower PSE indicates higher compressibility. Therefore, PSE can forecast the potential compression ratio or accuracy that can be achieved after deploying the AI/ML compression model, without needing to actually train the model.

Additionally, PSE can quantify how much a particular preprocessing technique, such as phase discontinuity compensation, reduces the redundancy in CSI samples. The preprocessing method that results in the lowest PSE is most effective at enhancing compressibility.

By tracking PSE before and after preprocessing, the improvement in compressibility can be measured. This allows different candidate preprocessing pipelines to be compared and the optimal ones selected.

Furthermore, PSE can compare the inherent compressibility across different CSI datasets. Datasets with lower average PSE are easier to compress versus those with higher PSE.

Therefore, PSE is a valuable metadata that not only predicts final compression performance, but also evaluates preprocessing methods and determines the relative difficulty of compressing different CSI datasets.

Further, the UE 704 may apply a PSE-based preprocessing to CSI samples prior to compression by an AI/ML model. In Step 1, the antenna indices contained in the CSI samples are separated based on polarization type. For example, a multi-polarized uniform linear array may have alternating antenna elements with vertical and horizontal polarization. The antenna indices are sorted and separated into two groups—one for each polarization type. In Step 2, the antenna indices within each polarization group are reordered to minimize the PSE. Different candidate orderings of the antenna indices are evaluated. The ordering that results in the lowest PSE is selected.

Reordering the antennas aims to maximize smoothness and redundancy in the CSI values across the antenna dimension. Reordering to reduce PSE enhances compressibility, as measured by the PSE metric.

Another useful application of PSE for AI/ML model monitoring is detecting when the UE enters a new wireless environment. Simulations were performed to check the feasibility of using PSE for this purpose.

In wireless channels, line-of-sight (LOS) conditions occur when there is a clear direct path between the transmitter and receiver. In non-line-of-sight (NLOS) conditions, the direct path is obstructed by obstacles like buildings, and signals propagate via reflection, diffraction and scattering. PSE can effectively track changes when the channel conditions transform from LOS to NLOS or vice versa. This is because LOS and NLOS have very different multipath profiles that lead to variations in the PSE.

In LOS, the dominant direct signal path leads to less spectral dispersion and lower PSE. In NLOS, the lack of a strong direct path and prominence of scattered signals causes more spectral dispersion, increasing the PSE.

In the simulations, PSE was calculated from 1000 CSI samples collected in each environment. Distinct PSE distributions were obtained for different environments—LOS versus NLOS, and indoor versus outdoor. The LOS and NLOS PSE distributions show clear separation, indicating PSE effectively captures differences in multipath conditions. Similarly, the indoor and outdoor PSE distributions are distinct due to differences in propagation geometry.

The goal was not to explicitly identify a switch between specific environments like indoor-to-outdoor. Rather, it was to detect if the environment itself has changed, even if the new environment is unknown. The separability of the PSE distributions across environments shows PSE can flag an environmental change. When the calculated PSE drifts from the expected distribution, it signifies the UE has entered a new propagation environment.

Therefore, monitoring PSE provides a computationally simple yet effective way for UEs to detect changes in wireless environment. This can trigger appropriate adaptations in AI/ML models as the communication medium undergoes transitions.

Figure 13:
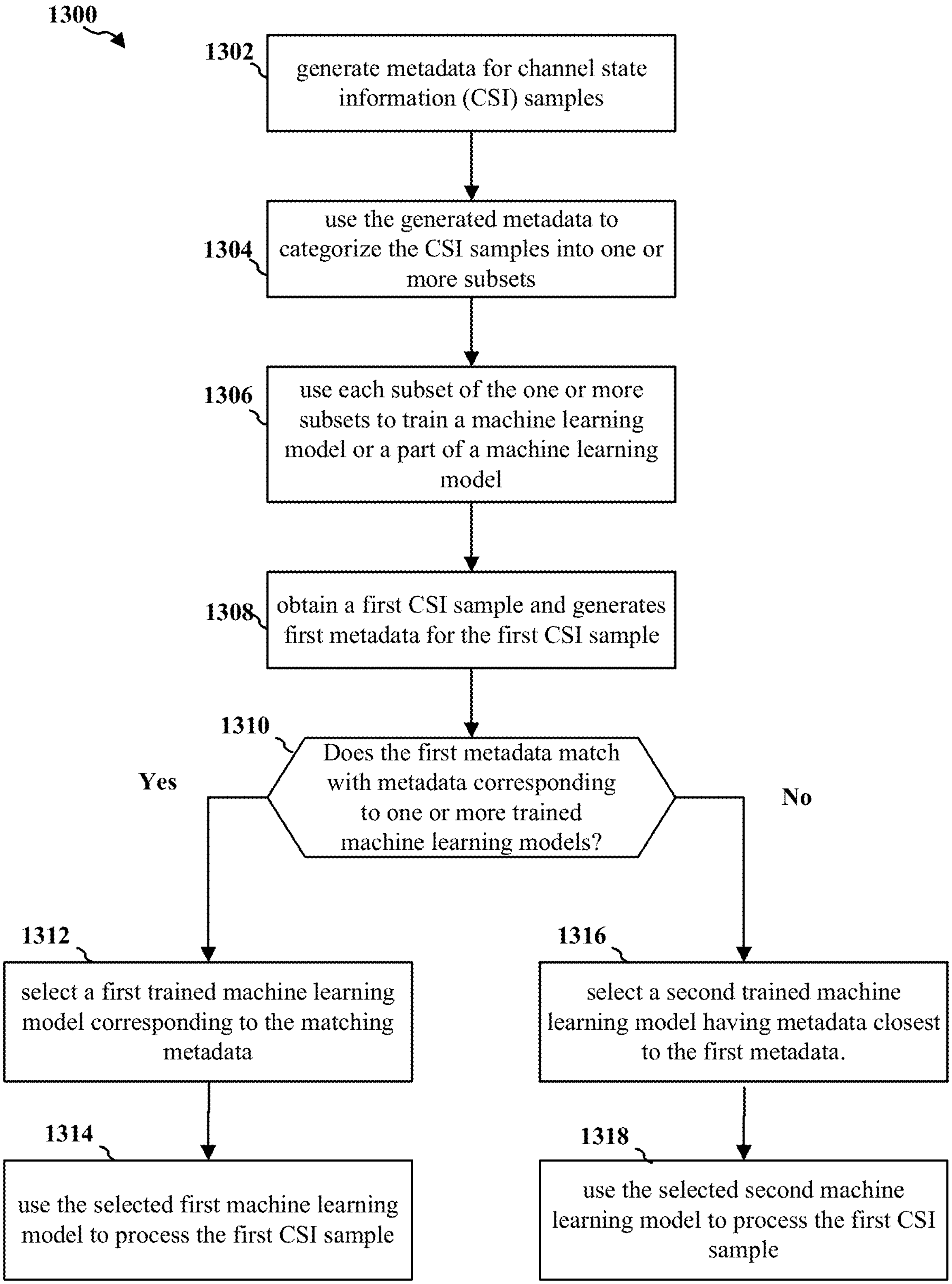
FIG. 13 is a flow chart of a method (process) for processing CSI samples.

FIG. 13 is a flow chart 1300 of a method (process) for processing CSI samples. The method may be performed by a UE (e.g., the UE 704). In operation 1302, the UE generates metadata for channel state information (CSI) samples. In operation 1304, the UE uses the generated metadata to categorize the CSI samples into one or more subsets. In operation 1306, the UE uses each subset of the one or more subsets to train a machine learning model or a part of a machine learning model. In operation 1308, the UE obtains a first CSI sample and generates first metadata for the first CSI sample.

In operation 1310, the UE matches the first metadata with metadata corresponding to one or more trained machine learning models. In operation 1312, when matching metadata is found, the UE selects a first trained machine learning model corresponding to the matching metadata. In operation 1314, the UE uses the selected first machine learning model to process the first CSI sample.

In operation 1316, when no matching metadata is found, the UE selects a second trained machine learning model having metadata closest to the first metadata. In operation 1318, the UE uses the selected second machine learning model to process the first CSI sample.

In certain configurations, to generate metadata, the UE calculates power spectral entropy (PSE) of the CSI samples. The UE may perform preprocessing of the CSI samples to reduce the PSE prior to using the selected first machine learning model to process the first CSI sample.

In certain configurations, the UE collects historical CSI samples and generates historical metadata based on the historical CSI samples. The UE matches the historical metadata to reference metadata. When the historical metadata matches the reference metadata, the UE maintains a currently activated machine learning model.

When the historical metadata does not match the reference metadata, the UE deactivates the currently activated machine learning model and activates a different machine learning model having reference metadata closer to the historical metadata.

In certain configurations, the metadata indicates compressibility of the CSI samples. The UE may identify a change in wireless environment based on changes in characteristics of the metadata. The metadata is generated for each CSI sample on a per CSI sample basis.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
- generating metadata for channel state information (CSI) samples, wherein the generating metadata comprises calculating power spectral entropy (PSE) of the CSI samples;
- using the generated metadata to categorize the CSI samples into one or more subsets;
- using each subset of the one or more subsets to train a machine learning model or a part of a machine learning model;
- obtaining a first CSI sample;
- generating first metadata for the first CSI sample;
- matching the first metadata with metadata corresponding to one or more trained machine learning models; and
- when matching metadata is found,
  - selecting a first trained machine learning model corresponding to the matching metadata; and
  - using the selected first machine learning model to process the first CSI sample.

2. The method of claim 1, further comprising:
- when no matching metadata is found,
  - selecting a second trained machine learning model having metadata closest to the first metadata; and using the selected second machine learning model to process the first CSI sample.

3. The method of claim 1, further comprising preprocessing of the CSI samples to reduce the PSE prior to using the selected first machine learning model to process the first CSI sample.

4. The method of claim 1, further comprising:
collecting historical CSI samples;
generating historical metadata based on the historical CSI samples;
matching the historical metadata to reference metadata; and
when the historical metadata matches the reference metadata, maintaining a currently activated machine learning model.

5. The method of claim 4, further comprising:
when the historical metadata does not match the reference metadata,
deactivating the currently activated machine learning model; and
activating a different machine learning model having reference metadata closer to the historical metadata.

6. The method of claim 1, wherein the metadata indicates compressibility of the CSI samples.

7. The method of claim 1, further comprising: identifying a change in wireless environment based on changes in characteristics of the metadata.

8. The method of claim 1, wherein metadata is generated for each CSI sample on a per CSI sample basis.

9. An apparatus for wireless communication, the apparatus being a user equipment (UE), comprising:
a memory; and
at least one processor coupled to the memory and configured to:
generate metadata for channel state information (CSI) samples, where to generate metadata, the at least one processor is configured to calculate power spectral entropy (PSE) of the CSI samples;
use the generated metadata to categorize the CSI samples into one or more subsets;
use each subset of the one or more subsets to train a machine learning model or a part of a machine learning model;
obtain a first CSI sample;
generate first metadata for the first CSI sample;
match the first metadata with metadata corresponding to one or more trained machine learning models; and
when matching metadata is found:
select a first trained machine learning model corresponding to the matching metadata; and
use the selected first machine learning model to process the first CSI sample.

10. The apparatus of claim 9, wherein the at least one processor is further configured to:
when no matching metadata is found:
select a second trained machine learning model having metadata closest to the first metadata; and
use the selected second machine learning model to process the first CSI sample.

11. The apparatus of claim 9, wherein the at least one processor is further configured to preprocess the CSI samples to reduce the PSE prior to using the selected first machine learning model to process the first CSI sample.

12. The apparatus of claim 9, wherein the at least one processor is further configured to:
collect historical CSI samples;
generate historical metadata based on the historical CSI samples;
match the historical metadata to reference metadata; and
when the historical metadata matches the reference metadata, maintain a currently activated machine learning model.

13. The apparatus of claim 12, wherein the at least one processor is further configured to:
when the historical metadata does not match the reference metadata:
deactivate the currently activated machine learning model; and
activate a different machine learning model having reference metadata closer to the historical metadata.

14. The apparatus of claim 9, wherein the metadata indicates compressibility of the CSI samples.

15. The apparatus of claim 9, wherein the at least one processor is further configured to identify a change in wireless environment based on changes in characteristics of the metadata.

16. A non-transitory computer-readable medium storing computer executable code for wireless communication of a receiver, comprising code to:
generate metadata for channel state information (CSI) samples, where to generate the metadata, the code is configured to calculate power spectral entropy (PSE) of the CSI samples;
use the generated metadata to categorize the CSI samples into one or more subsets;
use each subset of the one or more subsets to train a machine learning model or a part of a machine learning model;
obtain a first CSI sample;
generate first metadata for the first CSI sample;
match the first metadata with metadata corresponding to one or more trained machine learning models; and
when matching metadata is found:
select a first trained machine learning model corresponding to the matching metadata; and
use the selected first machine learning model to process the first CSI sample.

* * * * *